Patented Aug. 24, 1954

2,687,435

UNITED STATES PATENT OFFICE 2,687,435

1,14-DIMETHYL-2-KETO - 6,7 - DIHYDROXY-2,3,4,5,6,7,8,12,13,14 - DECAHYDROPHENANTHRENE AND PROCESS FOR PREPARING SAME

Robert B. Woodward, Belmont, Mass., assignor to Research Corporation, New York, N. Y., a corporation of New York No Drawing. Application May 19, 1953, Serial No. 356,083

4 Claims. (Cl. 260—586)

This application relates to methods and compounds useful in the production of steroids, particularly the adrenal cortical hormones such as cortisone.

In application Serial No. 220,977 are disclosed methods and compounds whereby the cis-adduct of 1,3-butadiene and 2-methyl-5-methoxybenzoquinone may be converted into a $\Delta^{9,(11),16}$-bisdehydro-21-norprogesterone capable of further conversion into steroid hormones. The disclosure includes methods of oxidizing the tricyclic ketone, 1,14-dimethyl - 2 - keto - 2,3,4,5,8,12,13,14-octahydrophenanthrene, to the 6,7-glycol with various oxidizing agents.

This application relates to a method of converting the same and related unsaturated tricyclic ketones of the formula

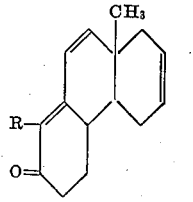

wherein R represents hydrogen or methyl to the corresponding cis-glycols of the formula

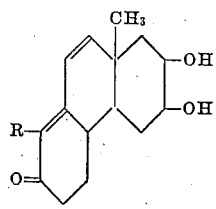

and to the glycol compounds thereby produced.

The method of the invention comprises reacting the unsaturated ketones with silver acetate and iodine in an organic solvent for the reactants, preferably a lower fatty acid and hydrolyzing the half-esters thereby produced to the corresponding glycols.

The reactions involved may be represented as follows:

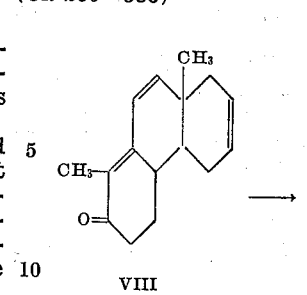

VIII

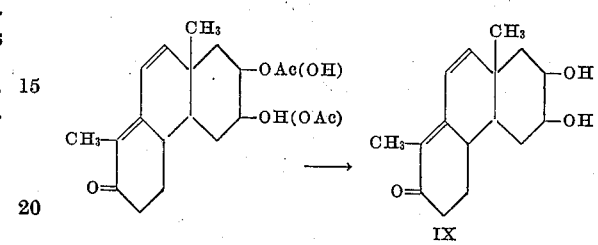

IX

Pale yellow tricyclic ketone (VIII-1,14-dimethyl - 2 - keto - 2,3,4,5,8,12,13,14 - octahydrophenanthrene) (10.00 g.) is dissolved in 200 ml. of glacial acetic acid (99.5%) in a three-necked ground glass flask equipped with stirrer, reflux condenser and thermometer. After addition of 16.43 g. of silver acetate, 11.69 g. of finely powdered iodine is added in small portions to the vigorously stirred reaction mixture over a one-half hour period at room temperature. When all of the iodine has been consumed (one-half hour after all the iodine has been added), 19.70 ml. of aqueous glacial acetic acid (0.0438 mole H₂O, prepared by dilution of 2.0 ml. of H₂O up to 50 ml. with glacial acetic acid) is added. The reaction mixture is then heated at 90–95° C. for three hours with vigorous stirring. At the end of this time it is cooled, treated with excess sodium chloride to precipitate unconsumed silver acetate, and filtered free from insoluble salts. The precipitate is thoroughly washed with hot benzene. The filtrate is evaporated at the water pump, taken up in methanol, filtered, neutralized with several ml. of a methanolic potassium hydroxide solution, and then treated under nitrogen with 3.1 g. of potassium hydroxide dissolved in methanol. Hydrolysis is allowed to proceed overnight at room temperature. The reaction product is then neutralized with dilute hydrochloric acid at ice bath temperature, a small amount of sodium bicarbonate is added, and methanol is removed at the water pump. The concentrated product is taken up in chloroform, washed with saturated sodium chloride solution, dried and stripped of solvent first at the water pump and then under oil pump vacuum to give a crystalline residue, wt. 12.20 g. The crude glycol is dissolved in a large volume of ethyl acetate by vigorous and prolonged heating on the steam bath, the solution is then concentrated by distilling off solvent until solid separates from the solution at which time the solution is cooled gradually to ice bath temperature attendant with the separation from solution of a large mass of fine needles. Filtration gives 7.48 g. (65%) of pale yellow cis-glycol, (IX-1, 14-dimethyl-2-keto-6,7-dihydroxy-2,3,4,5,6,7,8,12,13,14-decahydrophenanthrene) M. P. 184–185° C. A second crop of glycol, 0.713 g. (6%), M. P. 181–183° C., may be obtained from the mother liquors by concentration of the ethyl acetate solution making the overall yield 71%.

This application is a continuation-in-part of my application Serial No. 220,977, filed April 13, 1951.

I claim:
1. The method which comprises heating a compound of the formula

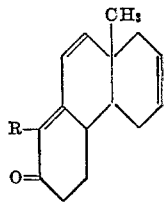

wherein R is selected from the group consisting of hydrogen and methyl with silver acetate and iodine in a lower fatty acid, and hydrolyzing the reaction product to the corresponding glycol of the formula

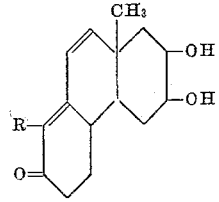

2. The method defined in claim 1 wherein the acid is glacial acetic acid.

3. The method which comprises heating 1,14-dimethyl-2-keto-2,3,4,5,8,12,13,14 - octahydrophenanthrene with silver acetate and iodine in glacial acetic acid and hydrolyzing the reaction product to 1,14-dimethyl-2-keto-6,7-dihydroxy-2,3,4,5,6,7,8,12,13,14-decahydrophenanthrene.

4. 1,14-dimethyl-2-keto-6,7-dihydroxy-2,3,4,5,-6,7,8,12,13,14-decahydrophenanthrene of the formula

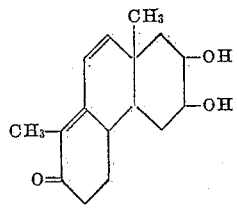

References Cited in the file of this patent

UNITED STATES PATENTS

| Number | Name | Date |
| --- | --- | --- |
| 2,672,482 | Woodward | Mar. 16, 1954 |